United States Patent
Morita et al.

(10) Patent No.: US 9,312,669 B2
(45) Date of Patent: Apr. 12, 2016

(54) RESISTOR, METHOD OF ASSEMBLING THE SAME, AND SWITCHGEAR

(71) Applicant: Hitachi, Ltd., Tokyo (JP)

(72) Inventors: Ayumu Morita, Hitachi (JP); Naoya Okada, Hitachinaka (JP); Akitaka Shiina, Hitachinaka (JP); Kenji Tsuchiya, Hitachi (JP); Mitsuaki Yamamoto, Hitachinaka (JP); Hiroaki Morii, Hitachi (JP); Takao Yanagisawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 308 days.

(21) Appl. No.: 13/915,978

(22) Filed: Jun. 12, 2013

(65) Prior Publication Data

US 2013/0335887 A1 Dec. 19, 2013

(30) Foreign Application Priority Data

Jun. 13, 2012 (JP) .................................. 2012-133493

(51) Int. Cl.
| | |
|---|---|
| *H02B 5/00* | (2006.01) |
| *H02B 7/00* | (2006.01) |
| *H02B 13/00* | (2006.01) |
| *H01C 1/026* | (2006.01) |
| *H01C 17/00* | (2006.01) |
| *H01C 1/024* | (2006.01) |
| *H01C 7/12* | (2006.01) |

(52) U.S. Cl.
CPC ................ *H02B 13/00* (2013.01); *H01C 1/024* (2013.01); *H01C 1/026* (2013.01); *H01C 7/12* (2013.01); *H01C 17/00* (2013.01); *Y10T 29/49082* (2015.01)

(58) Field of Classification Search
CPC ........ H01C 1/024; H01C 1/026; H01C 17/00; H01C 7/12; H02B 13/00; Y10T 29/49082
USPC .......... 361/600–678; 338/226–276; 29/610.1, 29/613
See application file for complete search history.

(56) References Cited

U.S. PATENT DOCUMENTS 2,849,681 A * 8/1958 Belart ................ G01R 1/06788
 324/149
3,213,402 A * 10/1965 Tassara .................. H01C 17/02
 29/613

(Continued)

FOREIGN PATENT DOCUMENTS

| EP | 1 152 444 A1 | 11/2001 |
| EP | 2 523 194 A1 | 11/2012 |

(Continued)

*Primary Examiner* — Anthony Haughton
*Assistant Examiner* — Yahya Ahmad
(74) *Attorney, Agent, or Firm* — Volpe and Koenig, P.C.

(57) ABSTRACT

A resistor for suppressing magnetizing inrush current includes a container made of an insulating material and at least one resistive element housed in the container, the resistive element being connected to two bushings provided at the container, the outer surface of the container being coated with a conductive paint, and the paint being connected to the ground, thereby being able to be located between a cable and a switch, and being able to fix the outer surface thereof to a ground voltage level so that human contact safety is not impaired.

12 Claims, 7 Drawing Sheets

(56) References Cited

U.S. PATENT DOCUMENTS

| | | | | |
|---|---|---|---|---|
| 3,737,831 A * | 6/1973 | Rietz | H01H 33/165 | 338/260 |
| 3,745,415 A * | 7/1973 | Polley | H02H 3/331 | 361/46 |
| 4,241,373 A * | 12/1980 | Mara | G01R 15/142 | 324/126 |
| 4,328,523 A * | 5/1982 | Seguin | H02H 9/06 | 174/520 |
| 4,456,942 A | 6/1984 | Bronikowski | | |
| 5,210,676 A * | 5/1993 | Mashikian | H01C 7/12 | 361/117 |
| 5,936,825 A * | 8/1999 | DuPont | H01C 7/12 | 337/33 |
| 7,633,741 B2 * | 12/2009 | Hughes | H02B 11/26 | 174/70 B |
| 2002/0149372 A1 * | 10/2002 | Kikukawa | H01H 33/668 | 324/424 |
| 2008/0203062 A1 * | 8/2008 | Sato | H01H 33/24 | 218/134 |
| 2011/0304141 A1 * | 12/2011 | Van Dyck | H02J 3/1878 | 290/44 |
| 2012/0044616 A1 * | 2/2012 | Takahashi | H02B 13/01 | 361/611 |
| 2012/0152716 A1 * | 6/2012 | Kikukawa | H02B 1/22 | 200/5 A |
| 2012/0247932 A1 * | 10/2012 | Yanniello | H02B 11/24 | 200/50.22 |
| 2013/0001200 A1 * | 1/2013 | Morita | H01H 33/66238 | 218/135 |
| 2013/0256274 A1 * | 10/2013 | Faulkner | H01H 33/16 | 218/143 |

FOREIGN PATENT DOCUMENTS

| | | |
|---|---|---|
| JP | 55-059674 A | 5/1980 |
| JP | 2001-135207 A | 5/2001 |
| JP | 2002-075145 A | 3/2002 |
| JP | 2006-155503 A | 6/2006 |
| JP | 2011-142274 A | 7/2011 |

\* cited by examiner

RESISTOR, METHOD OF ASSEMBLING THE SAME, AND SWITCHGEAR

CLAIM OF PRIORITY

The present application claims priority from Japanese Patent application serial No. 2012-133493, filed on Jun. 13, 2012, the content of which is hereby incorporated by reference into this application.

TECHNICAL FIELD

The present invention relates to a resistor, a method of assembling the same, and a switchgear and more particularly to a resistor used to suppress magnetizing inrush current in a transformer, a method of assembling the same, and a switchgear.

BACKGROUND ART

In recent years, in order to address energy saving and global warming issues, renewable energy sources such as wind and sunlight have been attracting attention. Generally the capacity of such a renewable energy power generation system is small and in this case, the generation capacity is equivalent to the capacity of the transformer as a load connected with the system. Furthermore, as for conventional diesel generators and gas turbine generators, it is not uncommon that in a small scale system the generation capacity is equivalent to the capacity of the transformer as a load.

In such a system, if a circuit breaker or switch is turned on to magnetize the transformer, several kilo-amperes of inrush current flows due to saturation of the transformer core, which poses the problem that the output voltage of the generator declines. Also, when a plurality of transformers as loads are connected with the system, if during operation of one transformer another transformer is magnetized, the connected system might malfunction due to a decline in the supply voltage.

One solution to this problem is a closing resistor arrangement. In the closing resistor arrangement, two switches, a main and a sub switch, are used and the transformer is once magnetized through a resistor using the sub switch, then the resistor is bypassed using the main switch. In the closing resistor arrangement, the resistor suppresses magnetizing inrush current to solve the problem of a decline in the supply voltage.

Patent Literature 1 (JP-A No. 2002-75145) and Patent Literature 2 (JP-A No. 2006-155503) describe related techniques. Patent Literature 1 discloses a gas-blast circuit breaker in which a resistor for suppressing magnetizing inrush current is housed in a gas container and Patent Literature 2 discloses a closing resistor arrangement for the power supply system of a ship.

CITATION LIST

Patent Literature

[Patent Literature 1] JP-A No. 2002-75145
[Patent Literature 2] JP-A No. 2006-155503

SUMMARY OF INVENTION

Technical Problem

As mentioned above, the closing resistor arrangement as a method to suppress magnetizing inrush current is recognized as a theoretically easy-to-understood and reliable method. However, in its practical implementation, special attention must be paid to how the resistor is installed depending on the type of a switch or a switchgear which houses it.

Nowadays, hermetically sealed switchgears unsusceptible to the surrounding environment (salt damage, humidity, etc.), such as gas insulated switchgears (GIS), solid-insulated switchgears or vacuum insulated switchgears, are the main stream in the high-voltage field.

In these switchgears, high-voltage portions are all covered by a metal or conductive paint connected to the ground voltage so that even if a human being should touch them, he/she will not receive electric shock. In connecting a cable to the hermetically sealed switchgear described above, usually the cable is directly connected using a cable head. In this case, one problem is how a resistor for suppressing magnetizing inrush current is inserted or installed.

The present invention has been made in view of the above circumstances and an object thereof is to provide a resistor which can be installed between a cable and a switch to suppress magnetizing inrush current and whose outer surface can be fixed at a ground voltage level to prevent impairment of human contact safety, and a method of assembling the same and a switchgear.

Solution to Problem

In order to achieve the above object, according to one aspect of the present invention, there is provided a resistor which includes a container made of an insulating material and a resistive element housed in the container. The resistive element is connected to two bushings provided at the container, the outer surface of the container is coated with a conductive paint and the paint is connected to a ground.

In order to achieve the above object, according to a second aspect of the present invention, there is provided a method of assembling a resistor which includes the steps of: putting at least one resistive element in a container made of an insulating material with a metal plate previously fixed on a bottom thereof; mounting a metal plate over the resistive element; connecting a bushing conductor to each of the metal plates; mounting a spring over the metal plate located over the resistive element; after the steps above, mounting an insulating plug over the spring and a metal lid over the insulating plug; and after the steps above, fixing all of them with bolts.

In order to achieve the above object, according to a third aspect of the present invention, there is provided a switchgear which includes a circuit breaker and a resistor, in which the resistor is structured as mentioned above.

Alternatively a switchgear may include a circuit breaker including a resistor structured as mentioned above and another circuit breaker connected with the circuit breaker by a bus, in which cables connected to both the circuit breakers are connected by a transformer terminal.

Also alternatively a switchgear may include a circuit breaker including a resistor structured as mentioned above and another circuit breaker connected with the circuit breaker by a bus, in which a cable connected to the resistor is connected to the other circuit breaker.

Advantageous Effects of Invention

The present invention brings about an advantageous effect that a resistor for suppressing magnetizing inrush current can be located between a cable and a switch and the outer surface of the resistor can be fixed at a ground voltage level so that human contact safety is not impaired.

DESCRIPTION OF EMBODIMENTS

Next, a resistor according to the present invention and a switchgear including the resistor will be described referring to the accompanying drawings which illustrate the preferred embodiments of the present invention.

First Embodiment

Figure 1:
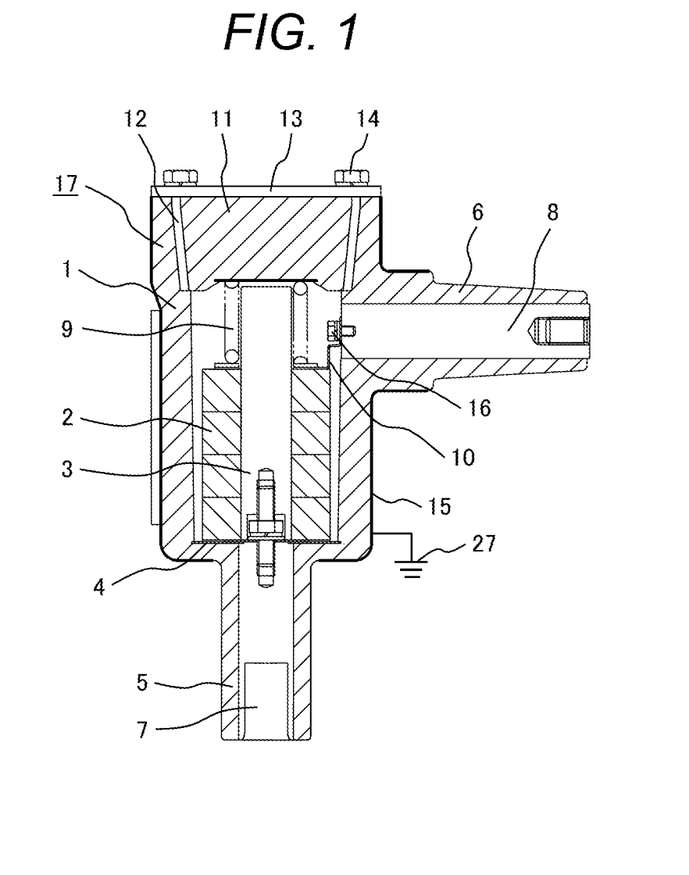
FIG. 1 is a side view of a resistor according to a first embodiment of the present invention.

FIG. 1 shows a resistor according to the first embodiment of the present invention. An explanation will be given of a resistor 17 for suppressing transformer magnetizing inrush current as the first embodiment shown in the figure.

In FIG. 1, a plurality of resistance elements 2 are housed in an insulation container 1 made of epoxy resin or the like. Although FIG. 1 shows a case that four resistive elements 2 are housed in the insulation container 1, only one resistive element 2 may be housed therein. The resistive elements 2 have the shape of a circular ring and an insulating bar 3 for alignment is provided in the center of the ring.

The insulation container 1 includes two bushings 5 and 6. The bushing 5 is connected to a switch 18 and the bushing 6 is connected to a cable 19.

Figure 2:
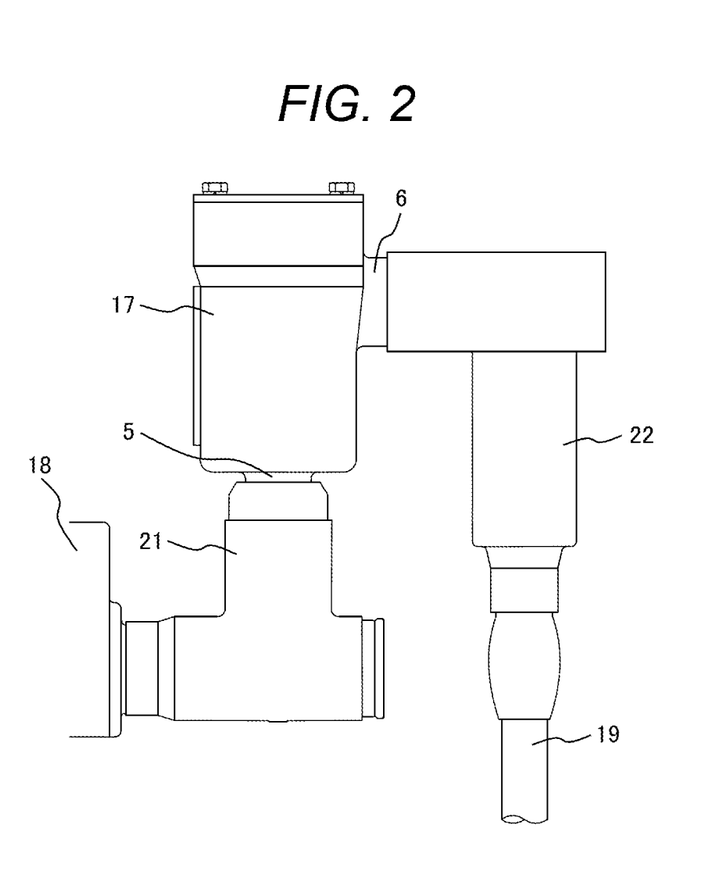
FIG. 2 shows the resistor according to the present invention which is connected to a switch and a cable.
Figure 3:
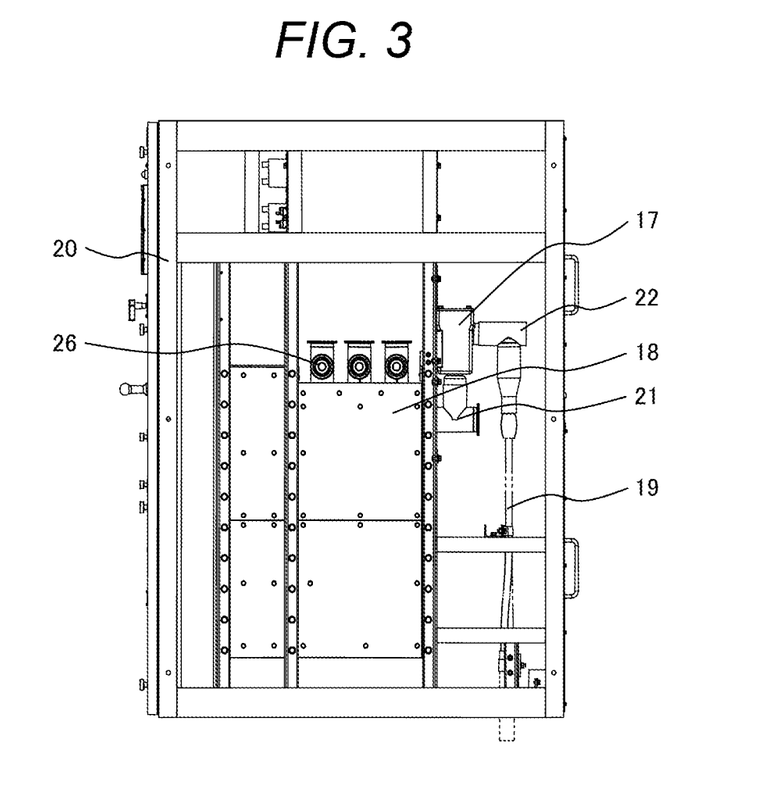
FIG. 3 is a side view of switchgear provided with the resistor according to the present invention.

FIGS. 2 and 3 show how the two bushings 5 and 6 are connected. As shown in the figures, the bushing 5 connected to the resistor 17 in a switchgear 20 is connected to the switch 18 in the switchgear 20 through a rubber adapter 21 and the bushing 6 connected to the resistor 17 is connected to the cable 19 through a cable head 22.

Usually the shapes of the bushings 5 and 6 are determined according to the members to be connected with them. In this embodiment, the bushing 5 has a shape to match the rubber adapter 21 for connection with the switch 18 and the bushing 6 has a shape to match the cable head 22 for connection with the cable 19.

If the shapes of the bushings 5 and 6 meet the IEEE (Institute of Electrical and Electronics Engineers) standards or DIN (Deutsche Industrie Normen) standards or other electrical standards, standard products may be used for the cable head 22 and rubber adapter 21.

Under the resistive element 2 at the bottom of the insulation container 1, a metal plate 4, which is fixed on the bottom of the insulation container 1 in advance in the process of molding the insulation container 1 with epoxy resin, is connected to a bushing conductor 7 in the bushing 5 and also a metal plate 10 mounted over the resistive elements 2 is connected to a bushing conductor 8 in the bushing 6.

The metal plate 10, resistive elements 2 and metal plate 4 are stacked in order and a spring 9 located over the metal plate 10 gives them contact pressure and reduces the contact resistance. In other words, the resistor 17 according to this embodiment is energized in the following route: from the bushing conductor 7 through the metal plate 4, the resistive elements 2 and the metal plate 10 to the bushing conductor 8.

The outer surface of the insulation container 1 is coated with conductive paint 15 except the bushings 5 and 6 and the conductive paint 15 is connected to a ground 27.

Next, the method of assembling the resistor 17 according to this embodiment will be described.

First, in the process of molding the insulation container 1 with epoxy resin or the like, the metal plate 4 is fixed at its bottom in advance and several resistive elements 2 are stacked in the insulation container 1 and in this state, the metal plate 10 is mounted over the resistive elements 2 and the metal plate 10 is connected with the busing conductor 8 with a screw 16. After the spring 9 is installed, a rubber cylinder 12, an insulating plug 11, and a metal lid 13 are mounted over them and all fixed with bolts 14.

The spring 9 is held compressed by the insulating plug 11. The rubber cylinder 12 is intended to ensure insulation performance. The rubber cylinder 12 is compressed between the insulation container 1 and insulating plug 11 to ensure insulation between the internal high-voltage parts and the grounded outer surface.

Figure 4:
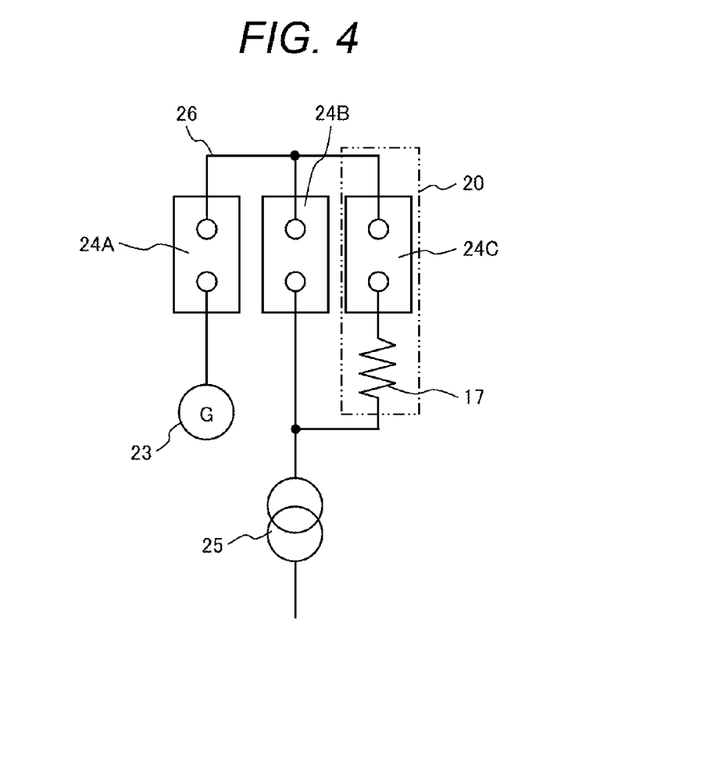
FIG. 4 is a circuit diagram of the switchgear connected to a power source and a transformer.

Next, how the resistor 17 according to this embodiment suppresses transformer magnetizing inrush current will be explained. FIG. 4 is a circuit diagram of the switchgear which is connected with a power source and a transformer.

As shown in FIG. 4, a generator 23 is connected to a circuit breaker 24A for protecting it and supplies power to a transformer 25 through a bus 26 and circuit breakers 24B and 24C. The circuit breaker 24C is connected to the resistor 17 according to this embodiment. The area enclosed by the chain double-dashed line in FIG. 4 corresponds to the switchgear 20.

Figure 5:
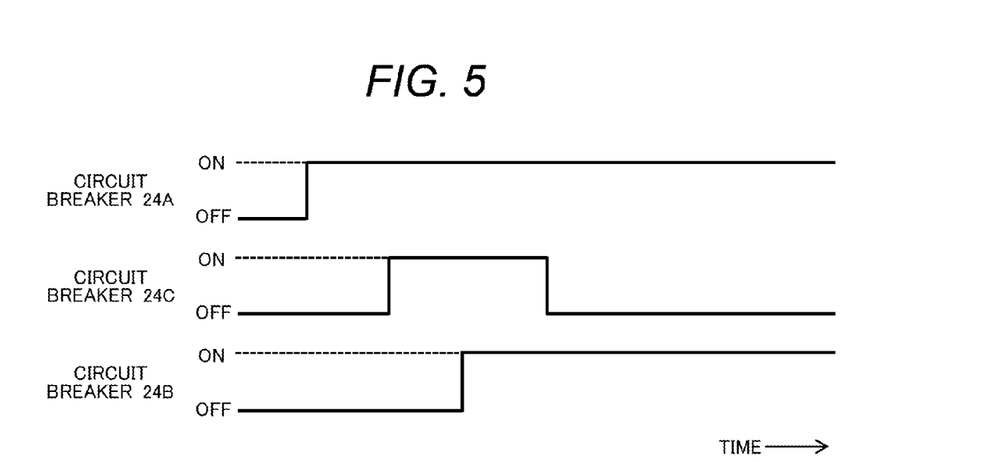
FIG. 5 shows timing to turn on and off circuit breakers to magnetize a transformer.

FIG. 5 shows timing to turn on and off the circuit breakers 24B and 24C to magnetize the transformer.

As shown in FIG. 5, first the circuit breaker 24A for protecting the generator 23 is turned on to charge the bus 26. Then, the circuit breaker 24C connected to the resistor 17 is turned on to magnetize the transformer 25.

Magnetizing inrush current I is limited as expressed by equation I=V/R, where V denotes the output voltage of the generator 23 and R denotes the resistance of the resistive elements 2.

For example, if resistance of 300Ω is used in a 6.6 kV generator, magnetizing inrush current is calculated as follows: 6600V×√2/√3/300Ω=18 Ap. From this, it is understood that magnetizing inrush current is remarkably reduced as compared with several kilo-amperes in the case that no resistor is used.

After the transformer 25 is magnetized by turning on the circuit breaker 24C, the circuit breaker 24B is turned on to bypass the resistor 17 so that this system shifts to normal operation.

For this system, it is a prerequisite that before the circuit breakers 24B and 24C are turned on, the bus 26 should be charged. Therefore, it is desirable to provide an interlock, for example, to trip the circuit breakers 24B and 24C when the bus 26 is not charged yet.

Figure 6:
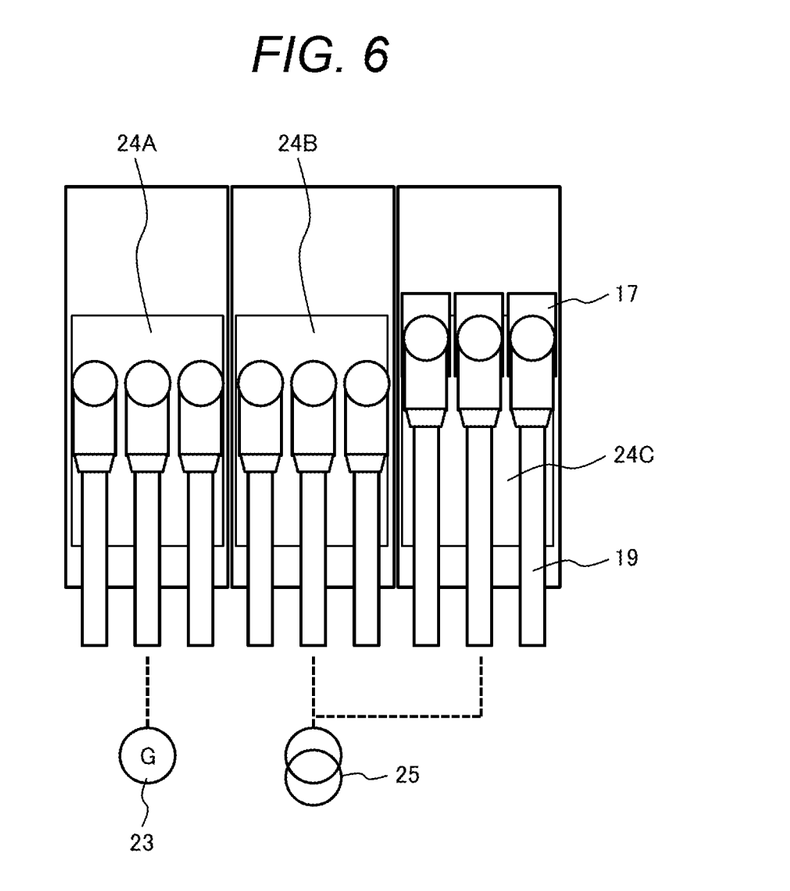
FIG. 6 shows the configuration of a switchgear implementing the circuit diagram of FIG. 4 according to one embodiment.

FIG. 6 shows the configuration of a switchgear according to this embodiment in which three circuit breakers are arranged side by side to implement the circuit diagram of FIG. 4.

As shown in FIG. 6, the cables 19, which are connected to the circuit breaker 24B and the circuit breaker 24C connected to the resistor 17, are connected to the transformer 25 to realize the circuit configuration shown in FIG. 4.

In the constitution of this embodiment, the resistor 17 is installed between the switch 18 and cable 19, in which the insulation container 1 of the resistor 17 houses a plurality of resistive elements 2 and the outer surface of the insulation container 1 is coated with the conductive paint 15 to set it to a ground voltage level, so that magnetizing inrush current in the transformer 25 is suppressed without impairing human contact safety.

In addition, since the bushings 5 and 6 of the insulation container 1 are shaped in accordance with various standards, connection work can be easily done using a standardized cable head. In other words, the resistor 17 can be installed without the need for modifying the existing switch 18 and cable 19, thereby leading to high economic efficiency.

Therefore, this embodiment brings about an advantageous effect that a resistor for suppressing magnetizing inrush current can be installed between a cable and a switch and the outer surface of the resistor can be fixed at a ground voltage level so that human contact safety is not impaired.

Second Embodiment

Figure 7:
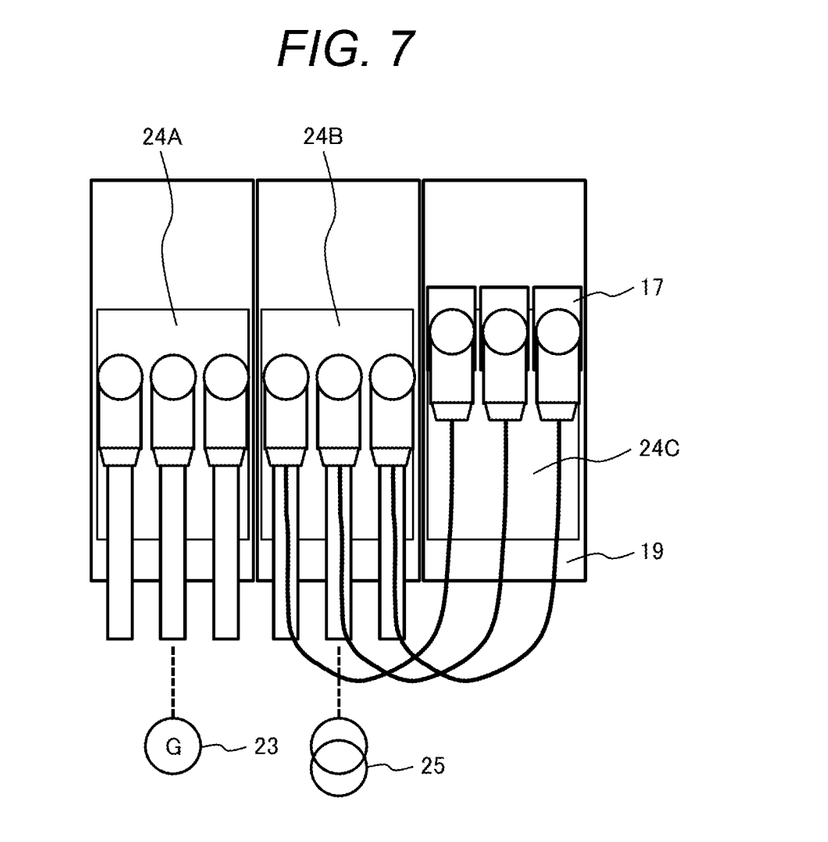
FIG. 7 shows the configuration of a switchgear implementing the circuit diagram of FIG. 4 according to other embodiment.
Figure 8:
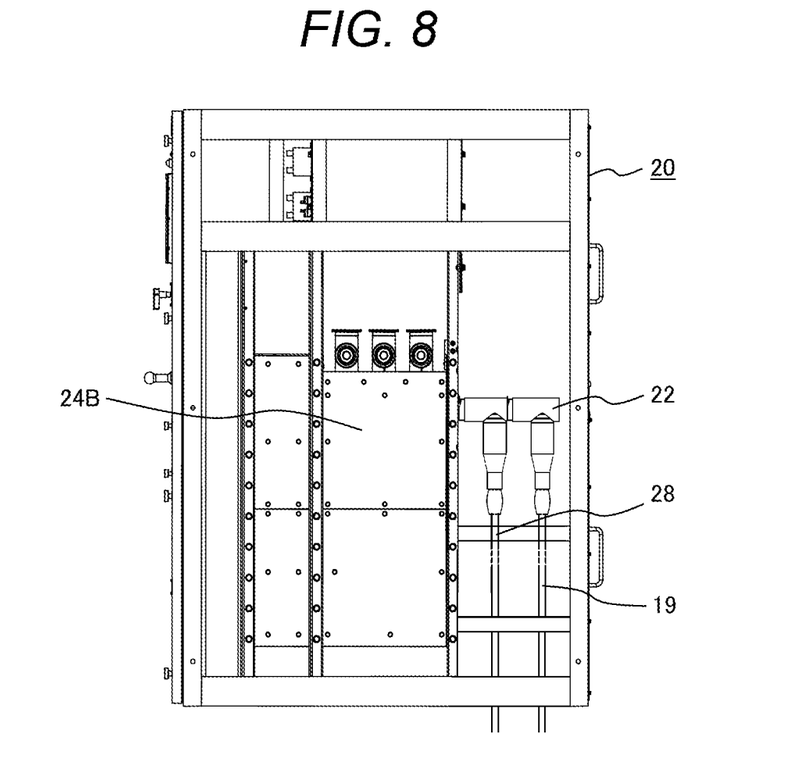
FIG. 8 is a side view of the switchgear shown in FIG. 7 and illustrates how cables are connected.

FIG. 7 shows the configuration of a switchgear which implements the circuit diagram of FIG. 4 according to a second embodiment. FIG. 8 is a side view of the switchgear shown in FIG. 7 which illustrates how cables are connected in the second embodiment.

Specifically, in the second embodiment, as shown in FIG. 7, the cable 19 connected to the resistor 17 is connected to the adjacent circuit breaker 24B and the cable head 22 is used to connect the cable 28 for connection with the transformer 25 and the cable 19 from the resistor 17.

According to the second embodiment, the circuit diagram of FIG. 4 can be implemented in the panel of the switchgear 20 and the number of cables to the transformer 25 can be decreased.

The present invention is not limited to the above embodiments and includes various modified forms thereof. The above embodiments have been described in detail to make it easy to understand the present invention. However, the present invention is not limited to a constitution which includes all the above constituent elements. The constitution of one embodiment may be partially replaced by the constitution of another embodiment and the constitution of one embodiment may be added to the constitution of another embodiment. Part of the constitution of one embodiment may be deleted or replaced by part of another constitution or part of another constitution may be added to it.

REFERENCE SIGNS LIST

1 . . . Insulation container
2 . . . Resistive element
3 . . . Insulating bar
4, 10 . . . Metal plate
5, 6 . . . Bushing
7, 8 . . . Bushing conductor
9 . . . Spring
11 . . . Insulating plug
12 . . . Rubber cylinder
13 . . . Metal lid
14 . . . Bolt
15 . . . Conductive paint
16 . . . Screw
17 . . . Resistor
18 . . . Switch
19, 28 . . . Cable
20 . . . Switchgear
21 . . . Rubber adapter
22 . . . Cable head
23 . . . Generator
24A, 24B, 24C . . . Circuit breaker
25 . . . Transformer
26 . . . Bus
27 . . . Ground

The invention claimed is:

1. A resistor comprising:
a container made of an insulating material; and
at least one resistive element housed in the container,
wherein the resistive element is connected to two bushings provided at the container;
wherein an outer surface of the container is coated with a conductive paint;
wherein the paint is connected to a ground;
wherein metal plates are located over and under the resistive element;
wherein the metal plates are connected to conductors of the bushings respectively;
wherein a spring is located over the metal plate located over the resistive element;
wherein an insulating plug is located over the spring and a metal lid is located over the insulating plug; and
wherein the spring is held compressed by the insulating plug.

2. The resistor according to claim 1,
wherein the container is made of resin; and
wherein at least one resistive element in a circular ring shape is housed in the container.

3. The resistor according to claim 1, wherein one of the two bushings is connected to a cable and the other bushing is connected to a switch.

4. The resistor according to claim 1, wherein a rubber cylinder is provided in a compressed state between the container and the insulating plug.

5. A method of assembling the resistor according to claim 1, comprising the steps of:
(a) putting the at least one resistive element in the container made of the insulating material with a metal plate previously fixed on a bottom thereof;
(b) mounting a metal plate over the resistive element;
(c) connecting respective bushing conductors of the two bushings to each of the metal plates;
(d) mounting a spring over the metal plate located over the resistive element;
(e) after the step (d) above, mounting an insulating plug over the spring and a metal lid over the insulating plug; and
(f) after the steps above, fixing all with bolts.

6. The method of assembling a resistor according to claim 5, wherein the spring is held compressed by the insulating plug.

7. The method of assembling a resistor according to claim 5,
wherein a rubber cylinder is provided between the container and the insulating plug; and
wherein the rubber cylinder is held compressed.

8. The method of assembling a resistor according to claim 6,
wherein a rubber cylinder is provided between the container and the insulating plug; and
wherein the rubber cylinder is held compressed.

9. A switchgear comprising:
a circuit breaker; and
a resistor,
wherein the resistor is the resistor according to claim 1.

10. The switchgear according to claim 9,
wherein a container of the resistor includes two bushings;
wherein one of the bushings is connected to a cable through a cable head; and
wherein the other bushing is connected to a switch through a rubber adapter.

11. A switchgear comprising:
a circuit breaker including the resistor according to claim 1; and
another circuit breaker connected with the circuit breaker by a bus,
wherein cables connected to both the circuit breakers are connected by a transformer terminal.

12. A switchgear comprising:
a circuit breaker including the resistor according to claim 1; and
another circuit breaker connected with the circuit breaker by a bus,
wherein a cable connected to the resistor is connected to the other circuit breaker.

* * * * *